(12) United States Patent
Yuan et al.

(10) Patent No.: US 12,091,482 B2
(45) Date of Patent: Sep. 17, 2024

(54) PHOTO-INDUCED CATIONIC POLYMERIZED PURE VEGETABLE OIL-BASED POLYMER, PREPARATION METHOD AND USE THEREOF

(71) Applicants: SOUTH CHINA AGRICULTURAL UNIVERSITY, Guangzhou (CN); GUANGDONG LANYANG TECHNOLOGY CO., LTD., Foshan (CN)

(72) Inventors: Teng Yuan, Guangzhou (CN); Jinqing Huang, Guangzhou (CN); Zhuohong Yang, Guangzhou (CN); Yaliang Xiao, Foshan (CN); Xiaoping Li, Foshan (CN)

(73) Assignees: SOUTH CHINA AGRICULTURAL UNIVERSITY, Guangzhou (CN); GUANGDONG LANYANG TECHNOLOGY CO., LTD., Foshan (CN)

( * ) Notice: Subject to any disclaimer, the term of this patent is extended or adjusted under 35 U.S.C. 154(b) by 550 days.

(21) Appl. No.: 17/422,748

(22) PCT Filed: Aug. 4, 2020

(86) PCT No.: PCT/CN2020/106773
§ 371 (c)(1),
(2) Date: Jul. 14, 2021

(87) PCT Pub. No.: WO2022/027220
PCT Pub. Date: Feb. 10, 2022

(65) Prior Publication Data
US 2022/0298282 A1    Sep. 22, 2022

(51) Int. Cl.
*C08F 2/48* (2006.01)
*C08F 242/00* (2006.01)

(52) U.S. Cl.
CPC ............. *C08F 242/00* (2013.01); *C08F 2/48* (2013.01)

(58) Field of Classification Search
CPC ................................ C08F 242/00; C08F 2/48
See application file for complete search history.

(56) References Cited

FOREIGN PATENT DOCUMENTS

| CN | 85100270 | 8/1986 |
|---|---|---|
| CN | 102559134 | 7/2012 |
| CN | 104892858 | 9/2015 |
| CN | 109666303 | 4/2019 |
| CN | 111154071 | 5/2020 |
| JP | 2009024058 | 2/2009 |

OTHER PUBLICATIONS

Yeping et al., "Study On Interpenetrating Polymer Networks Synthesized From Vegetable Oils", Polymeric Materials Science and Engineering, vol. 12, No. 5, Sep. 1996 pp. 118-121.
Yeping et al., "A Study on Crosslinked Copolymers synthesized from Vegetable Oils", Journal of Naval Academy of Engineering, , vol. 57, No. 4, pp. 33-35, Publication Date: Sep. 6, 1990.
Peng et al., "Research Progress in Vegetable Oil-Based UV Curable Coatings", Paint & Coatings Industry, vol. 46, No. 5, May 2016, pp. 81-87.
Tataru et al., "Hybrid free-radical and cationic photopolymerization of bio-based monomers derived from seed oils—control of competitive processes", Polymer Chemistry, Accepted Jul. 10, 2020 [11 pages].
Meiorin et al., "Polymeric networks based on tung oil Reaction and modification with green oil monomers", European Polymer Journal, 67:551-560, Accepted Jan. 10, 2015 [10 pages].
Huang et al., "UV thermal dual curing of tung oil-based polymers induced by cationic photoinitiator", Progress in Organic Coatings 126 (2019) 8-17, Accepted Oct. 22, 2018.
Branciforti et al., "Visible light 3D printing with epoxidized vegetable oils", Additive Manufacturing 25 (2019) 317-324, Available online: Nov. 19, 2018.

*Primary Examiner* — Yate' K Cutliff
(74) *Attorney, Agent, or Firm* — JMB Davis Ben-David

(57) ABSTRACT

The present invention relates to a photo-induced cationic polymerized pure vegetable oil-based polymer and a preparation method and use thereof. The preparation method comprises the following steps: mixing a dry oil, an epoxy vegetable oil and an initiator uniformly, irradiating to initiate a photo-curing reaction, and then placing at ambient temperature, and continuing to a heat-curing reaction so as to obtain a photo-induced cationic polymerized pure vegetable oil-based polymer. In the present invention, vegetable oil resources which are low in price, widespread, and easy to regenerate are used to prepare the pure vegetable oil-based polymers instead of the fossil-derived monomers completely, thereby achieving the efficient use of vegetable oils. In the present invention, an unconventional photo-induced heat frontal polymerization technology is used to prepare the pure vegetable oil-based polymer, thereby achieving a photo-thermal dual curing reaction of a vegetable oil system without heating. The preparation method of the present invention is simple, mild in the conditions, energy-saving and environment-friendly, stable in the product quality, and suitable for large-scale production.

8 Claims, No Drawings

PHOTO-INDUCED CATIONIC POLYMERIZED PURE VEGETABLE OIL-BASED POLYMER, PREPARATION METHOD AND USE THEREOF

CROSS-REFERENCE TO RELATED APPLICATIONS

This is the US National Stage of International Patent Application No. PCT/CN2020/106773, filed Aug. 4, 2020.

TECHNICAL FIELD

The present invention relates to the technical field of bio-based polymer materials, and in particular, to a photo-induced cationic polymerized pure vegetable oil-based polymer, a preparation method and use thereof.

BACKGROUND ART

Vegetable oil, as a renewable resource, is an ideal alternative resource for large-scale synthesis and preparation of chemical products and new energy products. The vegetable oil molecules contain 1-3 unsaturated double bonds in structure, and the double bonds can be directly polymerized or converted into epoxy groups for polymerization; therefore the vegetable oil has a structural basis for constructing a polymer material system. If the direct polymerization of the vegetable oil system is achieved, the vegetable oil is converted into a raw material for synthetizing polymers, thereby greatly reducing the dependency of the polymer material on the fossil resource, expanding the application field of the vegetable oil and greatly increasing the additional value. Although chemical workers have constantly engaged in the research on the application of renewable resources, currently the renewable resources, after the conventional polymerization, cannot achieve the performances comparable to those of petrochemical-based products, so that the product from the renewable resources cannot completely replace the petrochemical-based products as the mainstream polymer materials at present. Therefore, there are important theoretical research value and practical significance in developing a novel vegetable oil-based polymeric material with low-carbon emission, environment-friendly, excellent performance, high added-value by investigating the novel polymerization of the vegetable oil system, and exploring the mechanism of curing and polymerization. In order to achieve the application of vegetable oils in the field of pure vegetable oil-based polymer materials, it is the key point to investigate the novel and efficient polymerization of vegetable oils. Based on the requirements such as energy-saving, environment-friendly, and material properties, it becomes a hot spot to develop a rapid and energy-saving reaction for preparing a novel material. With the respect to the preparation of polymer materials, the polymerization such as the frontal polymerization and photo-initiated polymerization, has attracted great attention of many researchers due to the advantages of energy-saving, environment-friendly, and rapid reaction. Due to combining the dual advantages of the frontal polymerization and light-induced polymerization, the light-induced heat frontal polymerization, which combining the both, has broader application prospects.

SUMMARY

In order to overcome the disadvantages and deficiencies of the prior art, the primary object of the present invention is to provide a method for preparing a photo-induced cationic polymerized pure vegetable oil-based polymer.

Another object of the present invention is to provide a photo-induced cationic polymerized pure vegetable oil-based polymers prepared by the method described above.

Another object of the present invention is to provide the use of the light-induced cationic polymerized pure vegetable oil-based polymers in the field of coatings, inks, adhesives, plastics, fibers, 3D printing and composites.

The objects of the present invention are achieved by the following technical solutions:

A method for preparing a photo-induced cationic polymerized pure vegetable oil-based polymer, comprising the following steps:

A dry oil, an epoxy vegetable oil and an initiator are mixed uniformly, irradiated, and then placed at ambient temperature and continued to reaction, so as to obtain a photo-induced cationic polymerized pure vegetable oil-based polymer.

The dry oil is at least one of tung oil, linseed oil and Chinese tallow tree seed oil.

The epoxy vegetable oil is at least one of epoxy castor oil, epoxy soybean oil, epoxy linseed oil, epoxy rapeseed oil and epoxy tung oil.

The initiator is a photo-thermal dual initiator, particularly at least one of 2,4,6-triphenylpyranotetrafluoroborate (TPP), diaryliodonium salt, triarylsulfonium salt, and alkylsulfonium salt.

The irradiation time is 1-5 min, and the light source is a UV-LED point light source with a wavelength of 365 nm.

The heat-curing reaction time after the irradiation is 10-30 min.

In the preparation method, the mass ratio of various raw materials is 15-80% of the dry oil, 15-80% of the epoxy vegetable oil, and 1-5% of the initiator.

Frontal polymerization is a process for converting monomers into polymers by extending monomers in topical reaction through using in-situ self-propagating technologies. In the early stage of the reaction, energy is provided for a short time to initiate the monomer-monomer reaction in single batch, and the heat released from itself is used to initiate the reaction between components in adjacent zone, thereby completing the reaction in the whole zone, and finally completing the polymerization of the monomers. The frontal polymerization is mainly applied in an exothermic reaction, wherein only a short time of heating is required in the early stage of the reaction, and then the heating is stopped or the heating is completely absent, and the polymerization of monomers can be completed by means of the heat-autocatalytic action from the externally initiated exothermic reaction, and the whole reaction is carried out continuously, without stirring, and easy to control. Currently, the externally initiated frontal polymerization mainly comprises photo-initiated frontal polymerization, plasma-initiated frontal polymerization, laser-initiated frontal polymerization, etc.

Photo-initiated polymerization is a most efficient process for the rapid synthesis of polymers, which can be completed in only a few seconds. Photo-polymerization mainly comprises photo-initiated free radical polymerization and photo-initiated cationic polymerization, wherein the photo-initiated free radical polymerization is widely applied at present, but there are problems such as oxygen inhibition, severe volume shrinkage, limitation from curing thickness, and limitation from the light penetration, to limit its application in various technical fields. Although most of the ultraviolet curable resins currently used are based on free radical polymerization, the use of cationic polymerization for oligomers containing multifunctional monomers such as vinyl ethers or epoxy groups has numerous unique advantages.

The photo-thermal dual curing process of the dry oil is endothermic which requires irradiation and heating. The photo-induced heat frontal polymerization of the epoxy vegetable oil is exothermic, which requires irradiation, but does not require heating. If the dry oil and the epoxy vegetable oil are combined to construct a dual functional photo-polymerization system, the heat released from photo-polymerization of the epoxy vegetable oil can theoretically initiate the heat-curing process of the tung oil. When the cationic photoinitiator initiates the photo-thermal dual curing of the dry oil and epoxy vegetable oil system, both the dry oil and the epoxy vegetable oil can firstly undergo a photo-induced cationic polymerization, then the dry oil polymerization system generates peroxide as a co-initiator for thermal polymerization of the epoxy vegetable oil system due to the presence of oxygen, and the heat released from the epoxy vegetable oil system due to photo-induced cationic polymerization can initiate the curing process after the heat polymerization of the dry oil. The dry oil/epoxy vegetable oil system can undergo a photo-induced cationic polymerization, which is a photo-induced heat frontal polymerization, so that additional heating and addition of a co-initiator, such as hydrogen peroxide, can be avoided (heating-free and co-initiator-free system). In such system, the cationic polymerizations of the double bonds and the epoxy groups in the vegetable oil system are in synergistic action each other, wherein one can initiate the curing after the heat polymerization of the other one, respectively.

With respect to the prior art, the present invention has the following advantages and beneficial effects:

(1) In the present invention, the vegetable oil resource, which is low in price, widespread, and easy to regenerate is used to prepare a pure vegetable oil-based polymer instead of fossil-derived monomer completely, thereby achieving efficient use of vegetable oil. (2) In the present invention, the unconventional light-induced heat frontal polymerization technology is used to prepare a pure vegetable oil-based polymer, and achieved the photo-thermal dual curing of the vegetable oil system without heating, so that the present invention is simple in the preparation method, mild in the conditions, energy-saving, environment-friendly, stable in the product quality, and suitable for large-scale production. (3) In the present invention, during the curing process of the vegetable oil system, oxygen and peroxide are generated, thereby increasing the heat-curing reaction rate without adding hydrogen peroxide and isobutyl vinyl ether as co-initiators, and decreasing the heat-curing reaction time within 30 min.

DETAILED DESCRIPTION OF THE INVENTION

Hereinafter, the present invention will be further described in detail with reference to the examples, but the embodiments of the present invention are not limited thereto. The materials involved in the following examples are all commercial available.

Example 1

80 g of tung oil, 19 g of epoxy soya oil and 1 g of TPP are added to a transparent glass reactor, stirred uniformly, then placed under a UV-LED point light source with a wavelength of 365 nm, and irradiated for 1 min, and finally, continued to reaction at room temperature for 10 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 120° C., which can effectively initiate the heat-curing reaction in the late-stage, indicating that the initiator can successfully initiate the photo-induced heat frontal polymerization in the system.

Example 2

20 g of linseed oil, 78 g of epoxy linseed oil and 2 g of diaryliodonium salt are added to a transparent glass reactor, stirred uniformly, then placed under a UV-LED point light source with a wavelength of 365 nm, and irradiated for 5 min, and finally placed at room temperature and continued to reaction for 20 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 119° C., which can effectively initiate the heat-curing reaction in the late stage, indicating that the initiator can successfully initiate the photo-induced heat frontal polymerization in the system.

Example 3

60 g of Chinese tallow tree seed oil, 37 g of epoxy rapeseed oil and 3 g of triarylsulfonium salt are added to a transparent glass reactor, stirred uniformly, then placed under a UV-LED point light source with a wavelength of 365 nm, and irradiated for 3 min, and finally placed at room temperature and continued to reaction for 30 min, so as to obtain a pure vegetable oil-based polymer. During the reaction, a thermometer is used to monitor the temperature change of the reaction system. As shown in the tests by means of thermometer, the reaction temperature in the system at the end of the irradiation reaches 124° C., which can effectively initiate the heat-curing reaction in the late stage, indicating that the initiator can successfully initiate the photo-induced heat frontal polymerization in the system.

Example 4

16 g of tung oil, 80 g of epoxy tung oil and 4 g of alkylsulfonium salt are added to a transparent glass reactor, stirred uniformly, then placed under a UV-LED point light source with a wavelength of 365 nm, and irradiated for 3 min, and finally placed at room temperature, and continued to reaction for 15 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 118° C., which can effectively initiate the heat-curing reaction in the late stage, indicating that the initiator can successfully initiate the photo-induced heat frontal polymerization in the system.

Example 5

15 g of linseed oil, 80 g of epoxy castor oil and 5 g of TPP are added to a transparent glass reactor, stirred uniformly, then placed under a UV-LED point light source with a wavelength of 365 nm, and irradiated for 3 min, and finally placed at room temperature, and continued to reaction for 20 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 120° C., which can effectively initiate the heat-curing reaction in the late stage, indicating that the initiator can successfully initiate the photo-induced heat frontal polymerization in the system Example 6

80 of Chinese tallow tree seed oil, 15 g of epoxy soybean oil and 5 g of diaryliodonium salt are added to a transparent glass reactor, stirred uniformly, then placed under a UV-LED point light source with a wavelength of 365 nm and irradiated for 3 min, and finally placed at room temperature and continued to reaction for 30 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 119° C., which can effectively initiate the heat-curing reaction in the late stage, indicating that the initiator can successfully initiate the photo-induced heat frontal polymerization in the system.

Example 7

40 g of tung oil, 57 g of epoxy castor oil and 3 g of triarylsulfonium salt are added to a transparent glass reactor, stirred uniformly, then placed under a UV-LED point light source with a wavelength of 365 nm and irradiated for 3 min, and finally placed at room temperature and continued to reaction for 10 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 121° C., which can effectively initiate the heat-curing reaction in the late stage, indicating that the initiator can successfully initiate the photo-induced heat frontal polymerization in the system.

Example 8

50 g of linseed oil, 48 g of epoxy linseed oil and 2 g of alkyl sulfonium salt are added to a transparent glass reactor, stirred uniformly, then placed under a UV-LED point light source with a wavelength of 365 nm and irradiated for 3 min, and finally placed at room temperature and continued to reaction for 20 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 122° C., which can effectively initiate the heat-curing reaction in the late stage, indicating that the initiator can successfully initiate the photo-induced heat frontal polymerization in the system.

Example 9

29 g of Chinese tallow tree seed oil, 70 g of epoxy rapeseed oil and 1 g of TPP are added to a transparent glass reactor, stirred uniformly, and then placed under a UV-LED point light source with a wavelength of 365 nm and irradiated for 3 min, and finally placed at room temperature and continued to reaction for 30 min so as to obtain a pure vegetable oil-based polymer. During the reaction, a thermometer is used to monitor the temperature change of the reaction system. As shown in the tests by means of thermometer, the reaction temperature in the system at the end of the irradiation reaches 118° C., which can effectively initiate the heat-curing reaction in the late stage, indicating that the initiator can successfully initiate the photo-induced heat frontal polymerization in the system.

Performance tests of the pure vegetable oil-based polymer prepared in each example.

The degree of crosslinking is characterized by the gel rate, wherein the higher the gel rate, the higher the degree of crosslinking. The gel content of the cured coating is determined by an acetone method, wherein each cured coating is immersed in 20 mL acetone-containing glass vial at room temperature for 48 h, then dried at 60° C. until constant weight. Gel rate=$W_1/W_0 \times 100\%$, wherein $W_0$ and $W_1$ represent the mass before soaking and after soaking and drying, respectively.

Hardness tests are carried out according to Paints and varnishes-Determination of film hardness by pencil test (GB/T 6739-2006).

Thermal Stability Analysis (TGA analysis) is carried out by using Thermogravimetric Analyzer Type STA 449C from Netzsch Corporation, Germany, to test the abovementioned cured films, with heating rate: 10° C./min; atmosphere: nitrogen; temperature range: 35-660° C. The initial decomposition temperature when the mass loss of each example reaches 5% is recorded in Table 1.

Dynamic Thermal Mechanical Analysis (DMA) is carried out by using Dynamic Mechanical Analyzer DMA 242C, from Netzsch Corporation, Germany, to test the abovementioned cured films, with sample holder: stretch holder; oscillation frequency: 1 Hz; sample size: 20 mm×6 mm×0.5 mm; heating rate: 3° C./min; temperature range: −80-180° C. The measured glass transition temperature (Tg) of the cured film is reported in Table 1.

Mechanical Performance Analysis is carried out by using Universal Testing Machine type AGS-X 1 kN, from Shimadzu Corporation, Japan, to test the abovementioned cured films, with cross head speed: 10 mm/min; sample size: 40 mm×10 mm×0.5 mm.

TABLE 1

Comprehensive performance test results of the final product of each example

| Example | Degree of Crosslinking/% | Hardness | Initial Decomposition Temperature $T_{5\%}$/° C. | $T_g$/° C. | Tensile Strength/MPa | Elongation at Break/% |
|---|---|---|---|---|---|---|
| 1 | 98.6 | 6H | 362.8 | 56.2 | 38.46 | 2.45 |
| 2 | 98.8 | 6H | 367.5 | 54.6 | 38.34 | 2.66 |

TABLE 1-continued

Comprehensive performance test results of the final product of each example

| Example | Degree of Crosslinking/% | Hardness | Initial Decomposition Temperature $T_{5\%}$/° C. | $T_g$/° C. | Tensile Strength/MPa | Elongation at Break/% |
|---|---|---|---|---|---|---|
| 3 | 99.0 | 6H | 366.8 | 55.6 | 37.99 | 2.62 |
| 4 | 98.5 | 6H | 365.7 | 54.4 | 38.21 | 2.21 |
| 5 | 98.6 | 6H | 366.5 | 55.8 | 38.36 | 2.56 |
| 6 | 98.7 | 6H | 367.6 | 54.2 | 38.87 | 2.62 |
| 7 | 98.8 | 6H | 366.6 | 55.9 | 38.35 | 2.44 |
| 8 | 98.6 | 6H | 362.8 | 55.4 | 37.90 | 2.34 |
| 9 | 98.9 | 6H | 368.4 | 56.0 | 38.11 | 2.78 |

The above examples are preferred embodiments of the present invention, but the embodiments of the present invention are not limited thereto. Any other changes, modifications, alternatives, combinations, and simplifications, made without departing from the spirit and principles of the present invention, which should be equivalent replacements, all fall in the scope of protection of the present invention.

The invention claimed is:

1. A method for preparing a photo-induced cationic polymerized pure vegetable oil-based polymer, comprising:
   mixing a dry oil, an epoxy vegetable oil and an initiator uniformly, performing irradiation, and then placing at ambient temperature and continuing to heat-curing reaction, to obtain a photo-induced cationic polymerized pure vegetable oil-based polymer;
   wherein the dry oil is at least one of tung oil, linseed oil and Chinese tallow tree seed oil.

2. The method for preparing a photo-induced cationic polymerized pure vegetable oil-based polymer according to claim 1, characterized in that the epoxy vegetable oil is at least one of epoxy castor oil, epoxy soybean oil, epoxy linseed oil, epoxy rapeseed oil and epoxy tung oil.

3. The method for preparing a photo-induced cationic polymerized pure vegetable oil-based polymer according to claim 1, characterized in that the initiator is a photo-thermal dual initiator.

4. The method for preparing a photo-induced cationic polymerized pure vegetable oil-based polymer according to claim 1, characterized in that the irradiation time is 1-5 min, and the light source is a UV-LED point light source with a wavelength of 365 nm.

5. The method for preparing a photo-induced cationic polymerized pure vegetable oil-based polymer according to claim 1, characterized in that the heat-curing reaction time after the irradiation is 10-30 min.

6. The method for preparing a photo-induced cationic polymerized pure vegetable oil-based polymer according to claim 1, characterized in that the mass ratio of various raw materials is 15-80% of the dry oil, 15-80% of the epoxy vegetable oil, and 1-5% of the initiator.

7. A photo-induced cationic polymerized pure vegetable oil-based polymer prepared by the method of claim 1.

8. The method for preparing a photo-induced cationic polymerized pure vegetable oil-based polymer according to claim 3, characterized in that the photo-thermal dual initiator is at least one of 2,4,6-triphenylpyranotetrafluoroborate, diaryliodonium salt, triarylsulfonium salt and alkylsulfonium salt.

* * * * *